(12) United States Patent
Nijdam et al.

(10) Patent No.: US 10,428,975 B2
(45) Date of Patent: Oct. 1, 2019

(54) PIPE CLAMP FOR A RANGE OF PIPE DIAMETERS

(71) Applicant: J. van Walraven Holding B.V., Mijdrecht (NL)

(72) Inventors: Frank Nijdam, Zeewolde (NL); Robert van der Mik, Loenen aan de Vecht (NL)

(73) Assignee: J. VAN WALRAVEN HOLDING B.V., Mijdrecht (NL)

( * ) Notice: Subject to any disclaimer, the term of this patent is extended or adjusted under 35 U.S.C. 154(b) by 0 days.

(21) Appl. No.: 15/780,275

(22) PCT Filed: Dec. 6, 2016

(86) PCT No.: PCT/NL2016/050848
§ 371 (c)(1),
(2) Date: May 31, 2018

(87) PCT Pub. No.: WO2017/099588
PCT Pub. Date: Jun. 15, 2017

(65) Prior Publication Data
US 2018/0347724 A1    Dec. 6, 2018

(30) Foreign Application Priority Data

Dec. 7, 2015 (NL) ...................................... 2015917

(51) Int. Cl.
*F16L 3/10* (2006.01)
*F16L 3/24* (2006.01)

(52) U.S. Cl.
CPC ............... *F16L 3/1041* (2013.01); *F16L 3/24* (2013.01); *F16L 3/1008* (2013.01); *F16L 3/1033* (2013.01); *F16L 3/1075* (2013.01)

(58) Field of Classification Search
CPC ......... F16L 3/1041; F16L 3/24; F16L 3/1211; F16L 3/1008; F16L 3/1083; F16L 3/00;
(Continued)

(56) References Cited

U.S. PATENT DOCUMENTS

| | | | |
|---|---|---|---|
| 1,302,544 A * | 5/1919 | Hartburg | F16L 3/24 248/72 |
| 3,146,982 A * | 9/1964 | Budnick | F16L 3/237 24/135 R |

(Continued)

FOREIGN PATENT DOCUMENTS

| | | |
|---|---|---|
| JP | S 48-55399 U | 7/1973 |
| JP | S 49-32197 U | 3/1974 |

*Primary Examiner* — Nkeisha Smith
(74) *Attorney, Agent, or Firm* — Hoffmann & Baron, LLP

(57) ABSTRACT

A pipe clamp includes two clamp parts, each clamp part having a curved pipe clamping portion, and an anchoring portion formed at or near a first end of each pipe clamping portion to anchor the pipe clamp to a profile element. The anchoring portion is formed as a leg with a hammerhead. A flange is formed at a second end of each pipe clamping portion. The flanges of the clamp parts are adapted to be positioned opposite each other. A tightening member is associated with the clamp flanges for tightening them together. The curved pipe clamping portion has a varying stiffness along the curve length between the first end and the second end of the pipe clamping portion, where on average the stiffness of the pipe clamping portion decreases or increases from the first end towards the second end.

3 Claims, 2 Drawing Sheets

(58) Field of Classification Search
CPC ... F16L 3/10; F16L 3/1033; F16L 3/12; F16L 3/13; F16L 3/127; F16L 55/035; H02G 3/30; H02G 3/32
USPC ......... 248/62, 63, 65, 61, 58, 73, 74.1, 74.2, 248/74.3, 74.4, 72
See application file for complete search history.

(56) References Cited

U.S. PATENT DOCUMENTS

| | | | | |
|---|---|---|---|---|
| 3,417,951 | A * | 12/1968 | Rebentisch, Jr. | F16L 3/127 248/62 |
| 3,463,428 | A * | 8/1969 | Kindorf | F16L 3/227 248/340 |
| 4,044,428 | A * | 8/1977 | Kowalski | F16L 3/24 24/16 R |
| 4,327,887 | A * | 5/1982 | Kumakura | F16L 3/24 248/229.15 |
| 4,516,296 | A * | 5/1985 | Sherman | F16L 3/24 24/20 LS |
| 5,129,608 | A * | 7/1992 | Goldman | B29C 61/0608 248/74.3 |
| 5,669,589 | A * | 9/1997 | Janssen | H02G 3/26 248/65 |
| 5,799,907 | A * | 9/1998 | Andronica | F16L 3/24 248/62 |
| 6,494,415 | B1 | 12/2002 | Roth | |
| 6,572,057 | B1 | 6/2003 | Roth | |
| 7,591,442 | B2 * | 9/2009 | Dinh | F16L 3/1033 248/62 |
| 7,744,042 | B2 * | 6/2010 | Heath | F16L 3/127 248/58 |
| 7,810,762 | B2 * | 10/2010 | Condon | F16L 5/02 248/65 |
| 8,091,839 | B2 * | 1/2012 | Whipple | F16L 3/04 24/279 |
| 8,833,706 | B2 * | 9/2014 | Elsmore | H02G 3/32 138/106 |
| 8,936,161 | B2 * | 1/2015 | Kimura | B01D 29/112 210/232 |
| 9,463,535 | B2 * | 10/2016 | Oyzerskiy | B64C 1/403 |
| 9,546,744 | B2 * | 1/2017 | Patil | F16L 3/24 |
| 9,903,524 | B2 * | 2/2018 | Lange | F16L 3/11 |
| 2006/0027715 | A1 * | 2/2006 | Dinh | F16L 3/1033 248/65 |
| 2014/0097304 | A1 * | 4/2014 | Mastro | F16L 3/24 248/73 |
| 2014/0197284 | A1 * | 7/2014 | Hikoyama | F16L 3/24 248/74.1 |
| 2018/0245716 | A1 * | 8/2018 | Nijdam | F16L 3/24 |

* cited by examiner

PIPE CLAMP FOR A RANGE OF PIPE DIAMETERS

CROSS-REFERENCE TO RELATED APPLICATIONS

This application is the National Stage of International Application No. PCT/NL2016/050848, filed Dec. 6, 2016, which claims the benefit of Netherlands Application No. NL 2015917, filed Dec. 7, 2015, the contents of which is incorporated by reference herein.

BACKGROUND OF THE INVENTION

The present invention relates to a pipe clamp for fastening a pipe to a channel type profile element having a longitudinal mounting slot having a slot width and being defined by slot edge portions. The pipe clamp includes two clamp parts, each clamp part having a curved pipe clamping portion, wherein in a mounted state the pipe clamping portions of the respective clamp parts are positioned opposite each other to accommodate a pipe section, with the clamp parts extending around diametrically opposite surface areas of said pipe section. Each clamp part also has an anchoring portion formed at or near a first end of each clamp part to anchor the pipe clamp to the profile element, said anchoring portion essentially being formed as a leg with a hammerhead, said hammerhead having a width that exceeds the slot width and said leg having a smaller width than the slot width, the anchoring portion furthermore having a thickness smaller than the slot width, whereby the hammerhead is insertable in the longitudinal slot of the profile element and rotatable to engage the slot edges. Furthermore each clamp part has a flange formed at a second end of each clamp part, said flanges of the clamp parts being adapted to be positioned opposite each other. The pipe clamp furthermore includes a tightening member associated with the clamp flanges for tightening them together.

Such a pipe clamp is shown in FIG. 4 of U.S. Pat. No. 6,494,415.

An example of a pipe clamp of the above mentioned type which has an isolating layer between the pipe and the pipe clamping portions is shown in FIG. 13 of US 2014/0097304.

When designing a pipe clamp it is desirable to dimension the clamp so that several diameters can be accommodated. Several factors influence the diameter range that can be accommodated. In a regular two-piece clamp the distance between the flanges, the application of a vibration insulating layer and the clamp part radius are the most important factors that influence the range. However in the case of the known clamp an extra challenge has presented itself.

The known pipe clamp is fixed to the rail by swiveling the two clamp parts around the pipe so that the two flanges end opposite each other at the top. This action moves the hammerheads at the bottom ends of the clamp parts so that they engage with the rail slot edge portions: a semi tightened position. This happens before the clamp is fully closed and tightened.

The present invention has for an object to provide a pipe clamp that provides in use a secure fixation of the pipe clamp on the profile element whilst at the same time pipes within a predetermined diameter range can be securely fastened.

SUMMARY OF THE INVENTION

This object is achieved by fastening a pipe to a channel type profile element having a longitudinal mounting slot having a slot width and being defined by slot edge portions, the pipe clamp including two clamp parts, each clamp part having:

a curved pipe clamping portion, wherein in a mounted state the pipe clamping portions of the respective clamp parts are positioned opposite each other to accommodate a pipe section, with the clamp portions extending around diametrically opposite surface areas of said pipe section;

an anchoring portion formed at or near a first end of each pipe clamping portion to anchor the pipe clamp to the profile element, said anchoring portion essentially being formed as a leg with a hammerhead, said hammerhead having a width that exceeds the slot width and said leg having a smaller width than the slot width, the anchoring portion furthermore having a thickness smaller than the slot width, whereby the hammerhead is insertable in the longitudinal slot of the profile element and rotatable to engage the slot edge portions; and a flange formed at a second end of each pipe clamping portion, said flanges of the clamp parts being adapted to be positioned opposite each other;

the pipe clamp furthermore including a tightening member associated with the clamp flanges for tightening them together, wherein:

the curved pipe clamping portion has a varying stiffness along the curve length between the first end and the second end of the pipe clamping portion, wherein on average the stiffness of the pipe clamping portion decreases or increases from the first end towards the second end, the pipe clamping portion has a hammerhead sided half and a flange sided half, and the curved pipe clamping portion has at least one reinforcing rib that extends tangentially over the hammerhead sided half of at least one of the pipe clamping portions towards the first end.

The pipe clamp according to the invention allows that in a region towards the first end of the clamping portion relatively more deformation is allowed than in the region towards the second end, or alternatively that in a region towards the second end of the clamping portion relatively more deformation is allowed than in the region towards the first end. Thus the region towards one of the ends mainly provides the flexibility for clamping pipes in a certain diameter range whereas the region towards the other end provides the rigidity to allow a secure fixation. The rib may extend over the entire tangential length of the hammerhead sided half, but may also extend over just a part of said length.

In a particularly practical embodiment the pipe clamping portion has a hammerhead sided half and a flange sided half, wherein on average the stiffness at the hammerhead sided half is higher than at the flange sided half.

The pipe clamp according to this embodiment of the invention allows that the flange sided clamping portion halves in particular deform to grip around a pipe. The difference between the semi tightened and the fully tightened position determines the clamping range of the pipe clamp. In the tightening of the clamp parts around the pipe it is important that the hammerhead sided halves of the clamp parts will not deform plastically, because then the engagement of the hammerheads on the slot edge portions of the profile element could deteriorate. This is achieved by the increased stiffness at the second end of the clamping portion.

In a possible further embodiment the rib has a varying height along said length, wherein the rib height increases towards the first end of the clamping portion. The hammerhead sided half is reinforced with a rib having a height that decreases, preferably to zero, towards the flange sided half. So the cross section bearing the highest load (induced by lever length of the clamp parts flange sided halves) has a full height rib. As the lever decreases so does the height of the rib according to this embodiment.

In a possible further embodiment the rib height increases continuously towards the hammerhead.

In another possible embodiment at least one perforation is provided in the flange sided half of at least one of the clamping portions thereby rendering said flange sided half less stiff. The flange sided half with reduced stiffness of the clamping portion allows easier closing of the clamp while fixing the clamp in the rail and simultaneously fixing a pipe in the clamp. Without the perforation the clamp would be in some cases very stiff and hard to close further after reaching the semi tightened position. This cut-out also serves to make sure the clamp parts form easier around the smaller pipe diameter(s) of the nominal clamping range.

The perforation also has a beneficial effect if the pipe clamp is provided with a vibration insulation inlay, for example made of rubber or another suitable elastomer. The vibration insulating inlay can be kept better in place by the perforations, because when the pipe clamp is tightened around a pipe, the vibration insulation material can flow through the perforation a little, whereby the vibration insulating material is anchored to some degree in the clamp halves.

As an alternative for the above described further embodiments it is also thinkable to form one or more ribs on the flange sided half and to form perforations in the hammerhead sided half of the clamping portion(s). These perforations and/or ribs may be shaped and configured in analogy with the above described.

The invention will be elucidated further in the following description of a preferred embodiment with reference to the drawings.

DETAILED DESCRIPTION OF THE INVENTION

Figure 1:
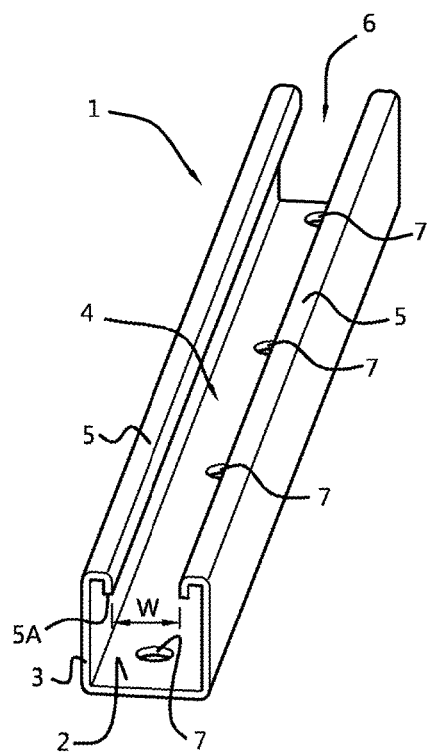
FIG. 1 shows in a view in perspective a channel type profile element.

FIG. 1 shows a channel type profile element 1. The channel type profile element 1 is a profile section often referred to as a "C-profile", a "C-rail" or a "strut rail". It has in cross section substantially a C-shape. The profile element 1 has a bottom 2, two opposite lateral walls 3 and a top side 4 which includes two inturned flanges 5 that define between them a slot 6. The slot 6 has a slot width w. In the bottom 2, mounting holes 7 are provided to mount the profile element to another structural element.

Figure 2:
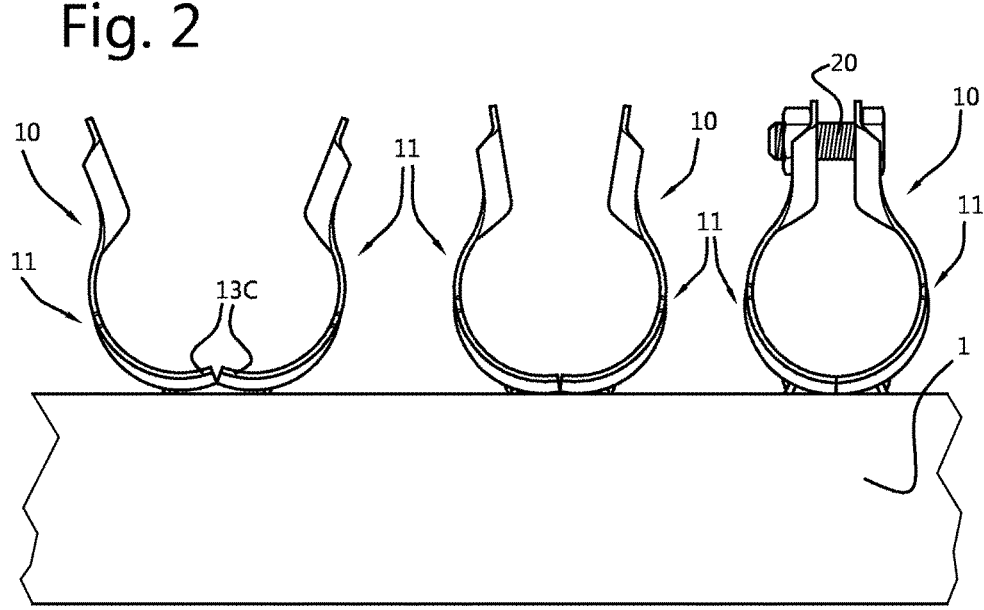
FIG. 2 shows in a side view a profile element with a pipe clamp according to the invention in an open state, in a semi tightened state and in a fully tightened state.
Figure 4:
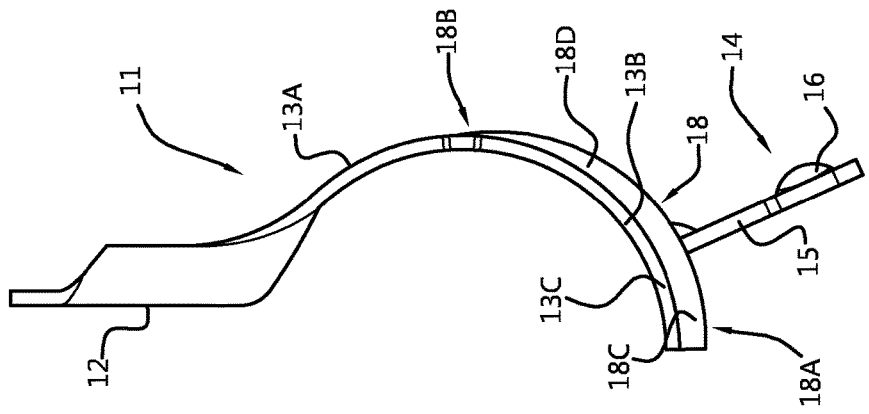
FIG. 4 shows the clamp half of FIG. 2 in a side view.

In FIG. 2 is shown the profile element 1 on which three pipe clamps 10 are mounted, each in a different mounting state. The left pipe clamp 10 is in an open state, the middle pipe clamp 10 is in a semi-tightened state and the right pipe clamp 10 is in a fully tightened state. The pipe clamp 10 holds a pipe 8 which is not shown in the figures. Also a tightening element such as a tightening screw 20 to tighten the clamp parts 11 towards each other and around the pipe is shown in the pipe clamp 10 most to the right in FIG. 2. The pipe clamp 10 has two clamp parts 11, one of which is shown in FIG. 3 and FIG. 4.

Figure 3:
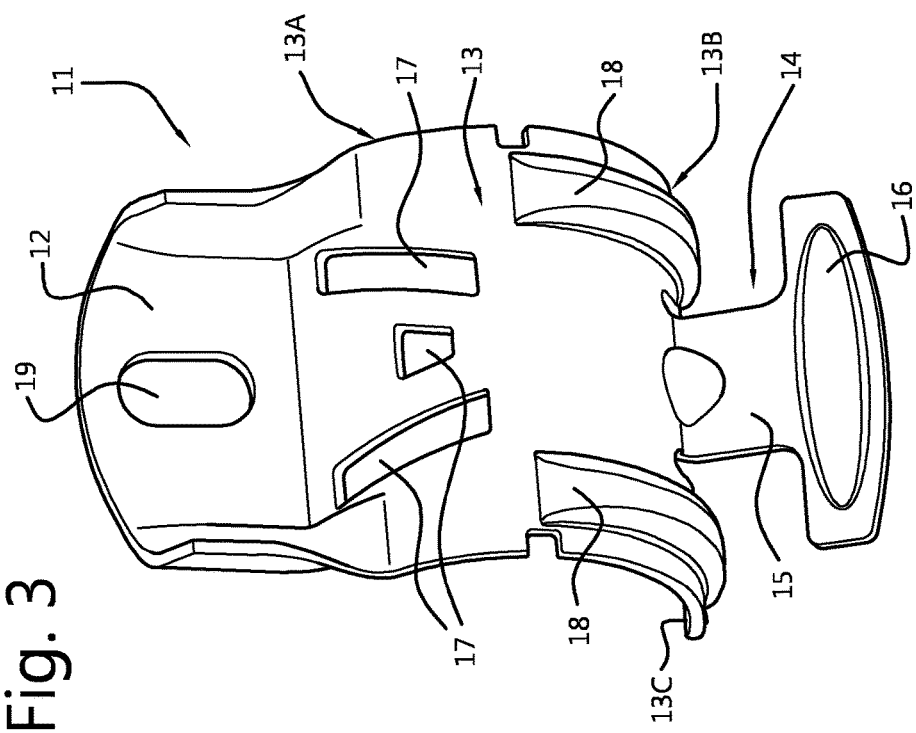
FIG. 3 shows in a view in perspective a clamp half of a preferred embodiment of pipe clamp according to the invention.

The clamp part 11 shown in FIG. 3 is made of metal, preferably formed from one piece of metal strip for example steel strip. It has a curved pipe clamping portion 13.

Furthermore the clamp part 11 has an anchoring portion 14 formed at one end of the clamp part 11 to anchor the pipe clamp 10 to the profile element 1. The anchoring portion 14 is essentially formed as a leg 15 with on its free end a hammerhead 16. The hammerhead 16 has a width that exceeds the slot width w and the leg 15 has a smaller width than the slot width w. The anchoring portion furthermore has a thickness smaller than the slot width w. Thus the hammerhead 16 is insertable in the longitudinal slot 6 of the profile element 1 beyond the lower end 5A (cf. FIG. 1) of the flanges 5 and rotatable to engage the slot edges formed by the lower end 5A of the inturned flanges 5.

The clamp part has a flange 12 formed at an end opposite the end where the anchoring portion 14 is located. The flange 12 is provided with a through hole 19 for passing through a screw or a bolt or another suitable tightening means.

The curved clamping portion 13 comprises a flange sided clamping portion half 13A and a hammerhead sided clamping portion half 13B.

During manufacturing the leg 15 is formed by two parallel cuts and bending the thus formed central strip out of the surface of which the curved pipe clamping portion is formed. Thereby two curved prongs 13C are formed at the end of the hammerhead sided half 13B of the curved pipe clamping portions 13.

In the hammerhead sided half 13B of the clamping portion 13, near either lateral edge, a reinforcing rib 18 is formed. The ribs 18 extend tangentially along the lateral edges.

In the shown embodiment the reinforcing rib 18 has a maximum height at a hammerhead sided end 18A of the reinforcing rib 18. This hammerhead sided end 18A of the reinforcing rib 18 is located on the prong 13C. The rib 18 thus extends beyond the location where the leg 15 adjoins the curved clamping portion 13. The rib height decreases towards the other end 18B of the reinforcing rib 18 to zero with respect to the thickness of the remainder of the clamping portion 13. The other end 18B of the rib 18 is preferably located where the hammerhead sided half 13B and the flange sided half 13A adjoin each other.

Preferably, the rib height increases from the end 18B to the end 18A according to a continuous function. The rib 18 may have a portion 18C that has a constant height and a portion 18D with a decreasing height.

In the flange sided half 13A of the clamping portion 13 is provided a set of perforations 17. The perforations locally reduce the cross sectional area of said half 13A. Thereby the flange sided half 13A of the clamping portion 13 is weakened. The weakening rendering said flange sided half 13A less stiff.

In the shown embodiment the perforations 17 are formed in the flange sided half 13A of the clamping portion 13 as weakening feature combined with ribs 18 that are formed in the hammerhead sided half 13B of the clamping portion 13 as reinforcing feature. Within the scope of the invention it is however also conceivable to provide only reinforcing ribs and/or alternative reinforcing features on the clamping portions 13 or only perforations and/or alternative weakening features on the clamping portions. Desired is only that the curved pipe clamping portion 13 has a varying stiffness along the curve length between the first end and the second end of the pipe clamping portion 13, wherein the stiffness at a hammerhead sided clamping portion half 13B is higher than at a flange sided half 13A of the pipe clamping portion.

In an alternative embodiment, which is not particularly preferred right now, it is thinkable to form one or more ribs on the flange sided half instead of on the hammerhead sided half and/or to form perforations in the hammerhead sided half instead of one the flange sided half of the clamping portion(s). These perforations and/or ribs may be shaped and configured in analogy with the above described.

It is noted that in the preferred embodiment that is shown in FIGS. 2-4, the clamp parts 11 are essentially the same and are mirror symmetrical with respect to each other, except for the holes 19 in the flanges 12, which may be different.

It is however also thinkable that the configuration is different and the clamp parts constituting one pipe clamp have a different shape and different stiffness properties. For example one of the clamp parts may have a curved clamping portion that describes a shorter arch and the other clamp part has a clamping portion that describes a longer arch than is shown in the preferred embodiment. In that case the flanges will not extend upwards in the mounted state as is shown in FIG. 2 on the right, but will extend obliquely upward. In such a configuration also the stiffness enhancing and decreasing measures such as ribs and perforations may be configured differently over the two clamp parts. It is such a case for example conceivable that the shorter arched clamping portion has only ribs or other reinforcing features, whereas the longer arched clamping portion has perforations in a zone near the flange and possibly reinforcing ribs near the anchoring portion of the part.

The invention claimed is:

1. A pipe clamp for fastening a pipe to a channel type profile element having a longitudinal mounting slot defined by slot edge portions, the pipe clamp including two clamp parts, each clamp part having:
   a curved pipe clamping portion, wherein in a mounted state the curved pipe clamping portions of the two clamp parts are positioned opposite each other to embrace a pipe section;
   an anchoring portion essentially being formed as a leg with a hammerhead at a first end of the curved pipe clamping portion for anchoring the pipe clamp to the profile element;
   a flange formed at a second end of the curved pipe clamping portion, wherein in said mounted state the flanges of the clamp parts are positioned opposite each other;
   the pipe clamp furthermore including a tightening member adapted to be associated with the clamp flanges for tightening the clamp flanges together,
   wherein each curved pipe clamping portion has a hammerhead sided half and a flexibly deformable flange sided half, wherein a reinforcing rib is formed on the hammerhead sided half, said reinforcing rib extending in a circumferential direction and having an increasing height towards the first end, whereby the hammerhead sided half has a higher stiffness than the flange sided half, and whereby said stiffness of the hammerhead sided half increases towards the first end.

2. The pipe clamp according to claim 1, wherein the rib height increases continuously.

3. The pipe clamp according to claim 1, wherein at least one perforation is provided in the flange sided half of the clamping portions thereby rendering said flange sided halves less stiff.

* * * * *